Patented Jan. 27, 1953

2,626,888

UNITED STATES PATENT OFFICE 2,626,888

VITAMIN $B_{12}$-ACTIVE SUBSTANCE ELUTION FROM MONTMORILLONITE ABSORBENTS

Stephen Kutosh, Kenilworth, George B. Hughey, Metuchen, and Robert S. Malcolmson, Cranford, N. J., assignors to Merck & Co. Inc., Rahway, N. J., a corporation of New Jersey No Drawing. Application September 7, 1950, Serial No. 183,664

5 Claims. (Cl. 167—81)

This invention relates to an improved method for obtaining anti-pernicious anemia active substances from fermentation broth, and more particularly to a process for recovering vitamin $B_{12}$ and vitamin $B_{12}$-like substances from montmorillonite adsorbents.

It had been found previously that vitamin $B_{12}$ can be isolated from aqueous solutions by adsorbing the vitamin on a solid adsorbent such as activated charcoal or fuller's earth, eluting the adsorbed vitamin $B_{12}$ with an aqueous solution of an organic base, such as pyridine and the like, and recovering vitamin $B_{12}$ from the resulting eluate. While this process is useful for isolating and recovering vitamin $B_{12}$, the use of pyridine and other organic bases in the eluting solution does have several serious disadvantages. One disadvantage is the serious loss of active principles which occurs during the processing. Further, the organic bases are expensive and it is therefore economically necessary to provide a means and equipment to recover these valuable chemicals. In addition, the use of eluting agents containing organic bases in recovering vitamin $B_{12}$ from montmorillonite adsorbates such as fuller's earth is difficult to carry out on a commercial scale, since the slurry of adsorbate and eluting agent is slimy and consequently extremely difficult to filter. Therefore, for most efficient operation, it was necessary to use activated charcoal as the adsorbing agent since the use of this adsorbent eliminated the operational difficulties previously encountered with fuller's earth. However, the use of activated charcoal is uneconomical since it is considerably more expensive than fuller's earth, and the amount of charcoal required is about 4 or 5 times more than is required when fuller's earth is used.

This invention is concerned with an improved method whereby vitamin $B_{12}$ and vitamin $B_{12}$-like substances may be recovered economically and in enhanced yields. It is one object of this invention to provide a practical process for recovering vitamin $B_{12}$ and vitamin $B_{12}$-like substances from montmorillonite adsorbents such as fuller's earth (calcium montmorillonite) or bentonite (sodium montmorillonite) utilizing only an aqueous inorganic solution for eluting these substances, and thereby avoiding the disadvantages of prior art procedures. It is a further object to provide a practical process for recovering and concentrating the vitamin and vitamin-like substances from solutions containing only minor amounts of said materials, utilizing the inexpensive montmorillonites as adsorbents and our improved eluting procedure. Other objects will be apparent from the detailed description of our invention hereinafter provided.

The foregoing and other objects of this invention are achieved by eluting vitamin $B_{12}$ and vitamin-like substances from montmorillonite adsorbents with an aqueous solution containing a minor amount of an anion of a nitrogen containing acid such as cyanide, thiocyanate or nitrite. We have found that an aqueous solution containing these anions and having a pH of at least 6.0 will effectively elute vitamin $B_{12}$ and $B_{12}$-like substances from montmorillonite adsorbents. Our process, in addition to providing an inexpensive eluting agent, also permits the recovery of enhanced yields of these important products which are therapeutically active in treating pernicious anemias. Further, it permits the use of an inexpensive montmorillonite in place of carbon to adsorb the vitamin $B_{12}$ and vitamin $B_{12}$-like substances from sources such as fermentation broths.

In accordance with one embodiment of our invention, our improved elution procedure is effected by intimately contacting the montmorillonite adsorbent with the aqueous eluting solution for a time sufficient to deadsorb the active principles. For example, this can be accomplished by stirring the eluting solution with the vitamin containing adsorbent and removing the spent adsorbent by filtration to recover an aqueous solution containing the desired active substances. The vitamin $B_{12}$ and vitamin $B_{12}$-like substances contained in more concentrated form in the aqueous eluates of our invention are then readily processed further to recover these products in purified form for therapeutic or other use.

In carrying out the improved procedures of our invention, it is necessary that the eluting solution have a pH of about 6.0 or greater, since at lower pH's the active principles remain adsorbed to a great extent and are not eluted by the solution. While, in general such aqueous solutions having a pH of at least 6 are useful in practicing our invention, we find that under optimum conditions best results are obtained by utilizing eluting solutions having a pH of about 7 to 9.

The eluting solution is most conveniently prepared by dissolving a stable alkali metal, alkaline earth metal, or ammonium salt of the desired acid in water, and if necessary, adjusting the pH to the desired level by the addition of a weak base such as ammonium hydroxide or an alkali metal carbonate or bicarbonate. Frequently, because of the acidic nature of the vitamin adsorbate being eluted we find it desirable to add an excess of such a weak base in order to neutralize the acidity of the adsorbate and maintain the eluting solution at the optimum pH.

The quantity and concentration of eluting solutions used will, of course, depend upon the particular adsorbate being eluted. Usually, we find that about 10 to 15 parts by weight of the eluting solution per part of adsorbate is satisfactory, although larger or smaller proportions of eluting solutions may be advantageous with certain adsorbates. While various concentrations of the inorganic salts can be used, we find that an amount of about 0.05 to 0.1% by weight of the inorganic salt in the eluting solution is usually sufficient to permit the obtainment of an optimum yield of the active principles.

The aqueous eluate obtained in accordance with the present invention may be processed further to recover the pure vitamin $B_{12}$ or vitamin $B_{12}$-like substances. The further treatment of the eluates will depend upon the anion used for the elution and the active principle to be recovered.

In carrying out the elution with a solution of a cyanide, the vitamin $B_{12}$ and vitamin $B_{12}$-like compounds contained on the adsorbent are converted to a purple colored cyanide complex. This cyanide complex is decomposed on treatment with an acid resulting in the formation of vitamin $B_{12}$. The vitamin $B_{12}$ may be recovered from the acidified solution by utilizing a purification procedure such as transferring the active substances from water to benzyl alcohol, chromatographing from activated alumina or charcoal, or distributing the active principle between benzyl alcohol and water in a multi-plate countercurrent distribution. Alternatively, two or more of these purification procedures may be used in combination.

When the aqueous eluting solution employed contains thiocyanate or nitrite anions, the resulting eluate contains both vitamin $B_{12}$ and vitamin $B_{12}$-like substances. These eluates can be further processed by the purification methods indicated above, to obtain vitamin $B_{12}$ and/or the vitamin $B_{12}$-like substances. However, generally we prefer to treat this mixture of vitamin $B_{12}$ and vitamin $B_{12}$-like substances with a source of cyanide ions in order to convert the vitamin $B_{12}$-like substances to vitamin $B_{12}$. In this way it is possible to avoid the difficulty of separating the vitamin $B_{12}$ and vitamin $B_{12}$-like substances and recover only one product.

Pursuant to a further embodiment of our invention, we have found that vitamin $B_{12}$ and vitamin $B_{12}$-like substances may be recovered in a more concentrated form from fementation broths and the like which contain only minor amounts of these principles. This is accomplished by adsorbing these minor amounts of vitamin and vitamin-like substances on a montmorillonite adsorbent, and eluting the active substances therefrom with an aqueous eluting solution such as those described previously. The eluates so obtained contain the active principles in considerably more concentrated form from which they may be recovered in purified form for therapeutic use by the methods previously indicated. Thus there is provided by our invention a practical and economical method for recovering vitamin $B_{12}$ and the vitamin $B_{12}$-like substances.

Our process is particularly useful in recovering vitamin $B_{12}$ and vitamin $B_{12}$-like substances from spent streptomycin broths. Such spent broths are obtained for example, by removing the streptomycin from the fermentation broth by adsorbing the antibiotic on a carboxylic acid type resin. To the resulting streptomycin-free broth is then added the montmorillonite adsorbent which removes the vitamin $B_{12}$ and vitamin $B_{12}$-like substances from the solution. The vitamin containing adsorbate is then separated from the spent broth as by filtration and further processed to recover the active principles in purified form as described above. For commercial operation we prefer to use fuller's earth as the montmorillonite adsorbent since this adsorbent is readily available and offers the minimum of processing difficulties. In actual practice, we find that about one part by weight of fuller's earth per 400 parts of broth are sufficient to completely adsorb the vitamin $B_{12}$ and vitamin $B_{12}$-like substances.

The term "vitamin $B_{12}$-like substances" as used herein refers to those substances which like vitamin $B_{12}$ are active in the treatment of pernicious anemias, and are converted to vitamin $B_{12}$ by reaction with a source of cyanide ions. They may be considered to be analogs of vitamin $B_{12}$ wherein the cyanide group of this vitamin is replaced by other radicals.

The following examples are presented to illustrate specific embodiments of our invention:

*Example 1*

Fermentation broth obtained from the propagation of a streptomycin-producing strain of *S. griseus* and from which the streptomycin had been removed by adsorption on a carboxylic acid resin, such as a granular copolymer of methacrylic acid and divinyl benzene containing 5% divinyl benzene, was acidified to pH 2.5. 0.10% by weight of fuller's earth and an equal amount of diatomaceous earth filter aid were added. The mixture was stirred about 30 minutes and filtered.

To one portion of the adsorbate was added an aqueous solution containing 28% ammonium hydroxide and 0.1% sodium cyanide, 5 parts of solution being employed per part of fuller's earth. The mixture was stirred about 30 minutes and filtered.

The resulting filtrate was then processed further to recover and isolate the vitamin $B_{12}$. The filtrate was first neutralized to pH 7 with acetic acid and to the neutral filtrate was added 50 g./liter of sodium bicarbonate and 100 g./liter of sodium sulfate. The solution was extracted once with ⅕ volume and twice with 1/10 volume of benzyl alcohol. The combined benzyl alcohol extracts of active substances were dried with anhydrous sodium sulfate. To the dried benzyl alcohol solution were added 5 volumes of acetone and 2 volumes of ether, to precipitate the active substances. The precipitate was removed by filtration and was dissolved in a minimum amount of methanol. The methanol solution was chromatographed on activated alumina. The alumina column was eluted with methanol containing about 2% acetic acid, the fractions of red color were collected, and the optical density was measured at 5500 Å (characteristic maximum for vitamin $B_{12}$). The measurement showed that 166 mg. of potential vitamin $B_{12}$ (90–98% of which is recoverable as crystalline vitamin $B_{12}$) was present per 1000 gals. of fermentation broth.

Two additional portions of the adsorbate were eluted with aqueous solutions containing 7% and 2.8% ammonium hydroxide, respectively, and 0.1% sodium cyanide, and were processed in the same manner. 203 mg. and 178 mg. of potential vitamin $B_{12}$ per 1000 gals. of broth were present in the products derived from 7% and 2.8% ammonium hydroxide, respectively.

Example 2

Fermentation broth of the type described in Example 1 and after acidification to pH 2.5 was treated with 0.10% by weight of fuller's earth. One portion of the adsorbate was eluted with an aqueous solution containing 3% sodium bicarbonate and 0.05% sodium cyanide, said solution being employed in a ratio of 5 parts by weight per part of fuller's earth. A second portion of the adsorbate was similarly eluted with an aqueous solution containing 1% sodium bicarbonate and 0.05% sodium cyanide.

The resulting eluates were then processed to recover the vitamin $B_{12}$ as follows: 300 g./liter of ammonium sulfate was added, and the solution was extracted once with 1/5 volume and twice with 1/10 volume of benzyl alcohol. The combined benzyl alcohol extracts were acidified to pH 6-6.5 with acetic acid, filtered, and dried over sodium sulfate. To the dried solution was added 60% by volume of carbon tetrachloride, and the solution was extracted four times with water, each extract being 1/10 the volume of the benzyl alcohol. The active substances present in the water extracts were again transferred to benzyl alcohol, back to water, and back to benzyl alcohol, in the same manner. The benzyl alcohol solution was dried over anhydrous sodium sulfate, precipitated with 5 volumes of acetone and 2 volumes of ether, dissolved in a minimum amount of methanol, acidified to pH 4.0 with acetic acid, precipitated with 7 volumes of acetone and 2 volumes of ether, and dissolved in a minimum amount of methanol containing 0.1 ml. of glacial acetic acid per 15 ml. of methanol. This solution was chromatographed on activated alumina. The alumina column was eluted with methanol, and the red-colored fractions were collected. The optical densities of these fractions were measured at 5500 Å. The measurements showed that 255 mg. and 217 mg. of potential vitamin $B_{12}$ per 1000 gals. of broth were present in the products derived from 3% and 1% sodium bicarbonate elution, respectively.

Example 3

The procedure described in Example 2 was repeated employing an aqueous eluting solution containing 2% of sodium bicarbonate and 0.05% of potassium cyanide. Using the same method described in the preceding example it was found that the resulting product contained 232 mg. of potential vitamin $B_{12}$ per 1000 gals. of broth.

When this experiment was repeated using an aqueous eluting solution containing only 2% of sodium bicarbonate the resulting product was found to contain only 5 mg. of potential vitamin $B_{12}$ per 1000 gals. of broth.

The results of these tests indicate that practically no active material is recovered when the eluting solution does not contain the cyanide ion.

Example 4

The procedure of Example 2 was repeated employing three different solutions in the elution of fuller's earth: (1) an aqueous solution containing 2% sodium bicarbonate and 0.1% sodium thiocyanate (2) an aqueous solution containing 2% sodium bicarbonate and 0.1% sodium nitrite, and (3) an aqueous solution containing 2% sodium bicarbonate, 0.1% sodium nitrite, and 2% sodium chloride. Additionally, the first water extracts of benzyl alcohol after the fuller's earth elutions were treated with 1 gm. of sodium cyanide per 400 ml. of solution (considerable excess) to convert vitamin $B_{12}$-like substances and vitamin $B_{12}$ to the vitamin $B_{12}$-cyanide complex. The amounts of potential vitamin $B_{12}$ present in the products derived from the several eluting solutions described above were (1) 192 mg.; (2) 224 mg., and (3) 258 mg. per 1000 gals. of broth.

Bentonite, which also has a high adsorptive capacity for vitamin $B_{12}$ and vitamin $B_{12}$-like substances, was used as the adsorbent to remove these active materials from solution. The adsorbate was eluted with solution (3), above, and the eluate was processed in the same general manner. The recovery of potential vitamin $B_{12}$ corresponded to that obtained from fuller's earth adsorbate.

Example 5

Eight production batches of S. griseus fermentation broth were treated with 0.25% by weight of fuller's earth. The adsorbates were sampled and eluted with 13 parts per part of adsorbate of an aqueous solution containing 2% sodium bicarbonate, 0.1% sodium nitrite, and 2% sodium chloride. The eluates were processed to determine the amounts of crystallizable vitamin $B_{12}$ removed. The results were as follows:

| Batch No. | Crystallizable Vitamin $B^{12}$ mg./1,000 gals. of broth |
| --- | --- |
| 1 | 454 |
| 2 | 474 |
| 3 | 406 |
| 4 | 347 |
| 5 | 420 |
| 6 | 306 |
| 7 | 397 |
| 8 | 478 |
| Average | 410 |

Various changes and modifications may be made in our invention, certain preferred embodiments of which are herein described, without departing from the scope thereof. It is our intention that such changes and modifications, to the extent that they are within the scope of the appended claims, will be construed as part of our invention.

We claim:

1. The process for recovering vitamin $B_{12}$ active substances from a montmorillonite adsorbent which comprises eluting said vitamin $B_{12}$-active substances with an aqueous solution having a pH in excess of about 6 and containing an acid anion selected from the group consisting of cyanide and thiocyanate ions.

2. The process as defined in claim 1 wherein the montmorillonite adsorbent is bentonite.

3. The process as defined in claim 1 wherein the montmorillonite adsorbent is fuller's earth.

4. The process for eluting vitamin $B_{12}$ active substances from a fuller's earth adsorbate which comprises intimately contacting said adsorbate with an aqueous solution having a pH of 7 to 9 and containing a source of cyanide ions.

5. The process for eluting vitamin $B_{12}$ active substances from a fuller's earth adsorbate which comprises intimately contacting said adsorbate with an aqueous solution having a pH of 7 to 9 and containing a source of thiocyanate ions.

STEPHEN KUTOSH.
GEORGE B. HUGHEY.
ROBERT S. MALCOLMSON.

REFERENCES CITED

The following references are of record in the file of this patent:

UNITED STATES PATENTS

| Number | Name | Date |
| --- | --- | --- |
| 2,134,256 | Laland | Oct. 25, 1938 |
| 2,530,416 | Wolf | Nov. 21, 1950 |
| 2,563,794 | Rickes | Aug. 7, 1951 |

FOREIGN PATENTS

| Number | Country | Date |
| --- | --- | --- |
| 473,064 | Great Britain | Oct. 5, 1937 |

OTHER REFERENCES

Rickes, Science, vol. 107; pages 396, 397 (Apr. 16, 1948).

Vitamins and Hormones, vol. III (1945) pages 269, 270.